INVENTOR.
JAY I. BLACK

United States Patent Office 3,620,081
Patented Nov. 16, 1971

3,620,081
FLUIDIC TEMPERATURE SENSOR MOUNT FOR A GAS TURBINE ENGINE
Jay I. Black, Orange, Conn., assignor to
Avco Corporation, Stratford, Conn.
Filed Feb. 2, 1970, Ser. No. 7,551
Int. Cl. G01k 3/06, 13/02
U.S. Cl. 73—340      8 Claims

ABSTRACT OF THE DISCLOSURE

Fluidic temperature sensor assembly for use in measuring the turbine inlet temperatures in a gas turbine engine. A series of circumferentially spaced tubes extending radially into the gas stream, each with a series of spaced inlets, are connected to a circumferential conduit. A discharge conduit extends from the circumferential conduit to a low pressure discharge point so that a relatively high volume, high velocity flow is established through the tubes and conduits. A Y-shaped tubular element is positioned at the junction between the discharge conduit and the circumferential conduit so that the inlets of the Y-shaped tubular element are coaxial with branches of the circumferential conduit to receive gas having a maximum velocity and temperature. The outlet from the Y-shaped tubular element leads to a fluidic oscillator whose pressure oscillations are in direct proportion to the average turbine inlet temperature. The conduits are immersed in cooling air used for a nozzle assembly at the turbine inlet. The portions of the radial tubes extending into the gas stream are covered with a tubular shell having an outlet so that cooling air flows over the tubular elements.

---

The present invention relates to mounting arrangements for fluidic temperature sensors and in particular mounting arrangements useful in gas turbine engines.

In recent years the fluidic oscillator has been looked upon with increasing favor as a rugged, simple and economical means for obtaining a direct measurement of turbine inlet temperatures of a gas turbine engine. An example of a particularly advantageous application of the fluidic oscillator to measure turbine inlet temperatures may be found in copending patent application Ser. No. 880,528, filed Nov. 28, 1969, entitled "Mounting of Fluidic Temperature Sensor in Gas Turbine Engines," of common inventorship and assignment with the present invention.

In that application there is shown the mounting of a fluidic oscillator within hollow air-cooled turbine nozzle vanes. With this arrangement the oscillator may be located extremely close to the hot gas stream whose temperature is to be measured. At the same time it is immersed in a flow of cooling air to enable its prolonged use to measure elevated temperatures.

There are, however, a number of engines which have turbine inlet nozzle assemblies so small that it is impractical to mount a fluidic oscillator with the passages of the blade. In addition, it is desirable in gas turbine engines to enable an average temperature which represents the average temperature at the inlet to a turbine nozzle and not just local measurement.

Therefore, it is an object of the present invention to provide a simplified, rugged and economical mounting for a fluidic temperature sensing in a gas turbine engine which enables it to be mounted in the motive fluid stream of the engine and be capable of rapid sensing average motive fluid stream temperatures for prolonged periods.

The above ends are achieved by a fluidic temperature sensing assembly comprising means for establishing a high velocity flow path for motive fluid from a station in a gas turbine engine to a low pressure discharge point. An inlet is provided in the flow path means to receive the portion of the fluid stream having the highest velocity and highest temperature. A fluidic oscillator is connected to the inlet so that it provides pressure oscillations in direct proportion to the temperature of the motive fluid at the station.

The above and other related objects and features of the present invention will be apparent from a reading of the description and the novelty thereof pointed out in the appended claims.

In the drawings:

FIG. 4 is a view taken on lines 4—4 of FIG. 2.

Figure 1:
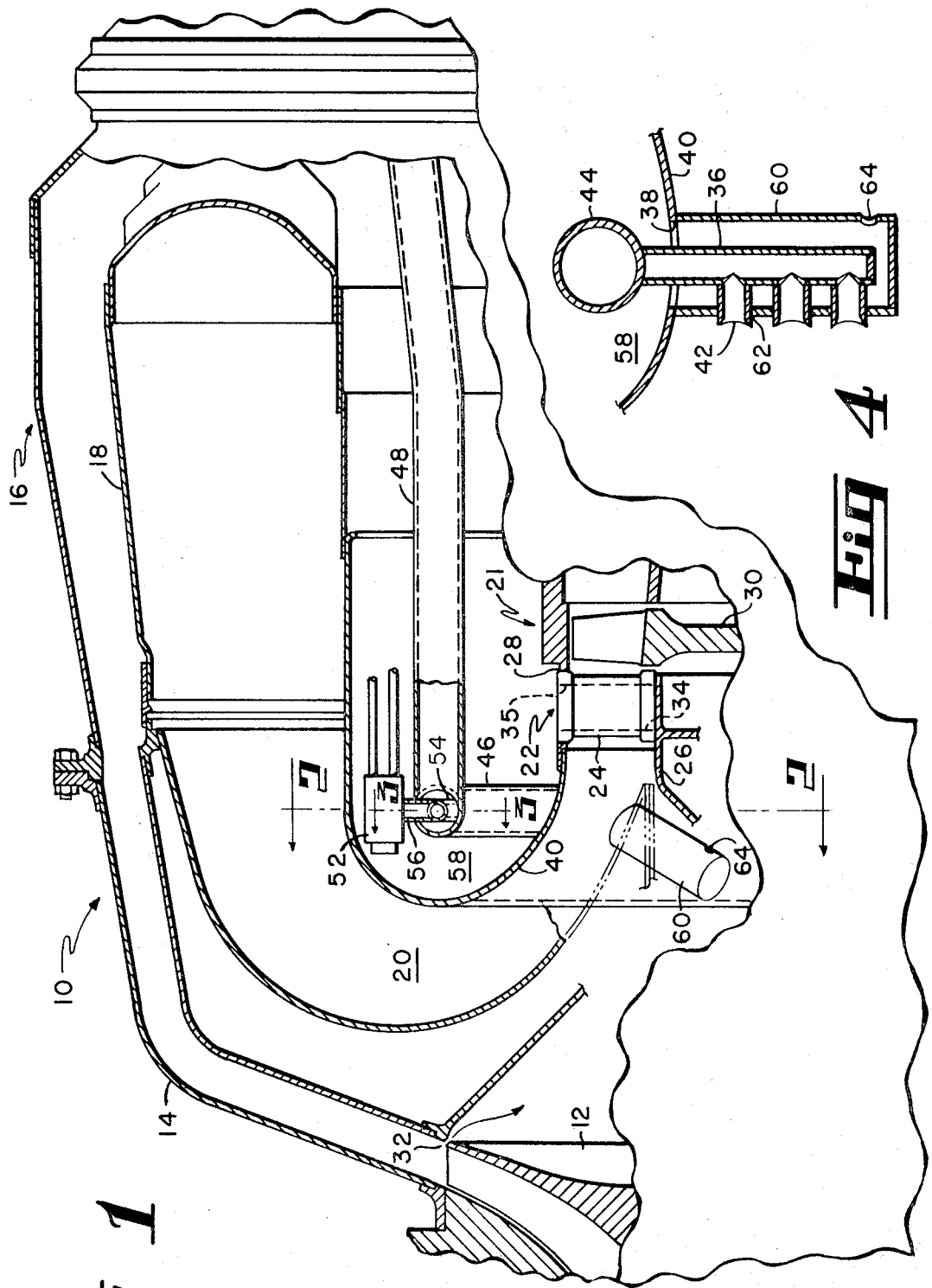
FIG. 1 is a fragmentary longitudinal section view of a gas turbine engine with which the fluidic oscillator embodying the present invention may be used.

Referring particularly to FIG. 1, there is shown a gas turbine engine 10 with which the present invention may be used. The engine comprises a rotatable centrifugal impeller 12 which discharges pressurized air to a diffuser and turning assembly 14 for delivery to a combustor assembly 16. A perforated combustor 18 has a fuel nozzle (not shown) which injects fuel into air admitted to the interior of the combustor and the resultant mixture is ignited by well known means to provide a hot gas stream. The hot gas stream discharges through an annular passageway 20 to a turbine nozzle assembly 22 at the inlet to a turbine 21. The turbine nozzle assembly 22 comprises a series of hollow vanes 24 secured to inner and outer annular supports 26 and 28, respectively. From there the gas stream is discharged across the first stage 30 of the turbine assembly 21. The first stage of the turbine assembly is generally used to drive the compressor impeller and subsequent stages may be employed to operate a power output shaft to provide a rotatable output. The turbine nozzle vanes 24 are cooled by air discharged from annular gap 32 at the tip of the compressor impeller 12 and pass through openings 34 in the inner sides of vanes 24 for discharge to openings 35 at their outer end.

Figure 2:
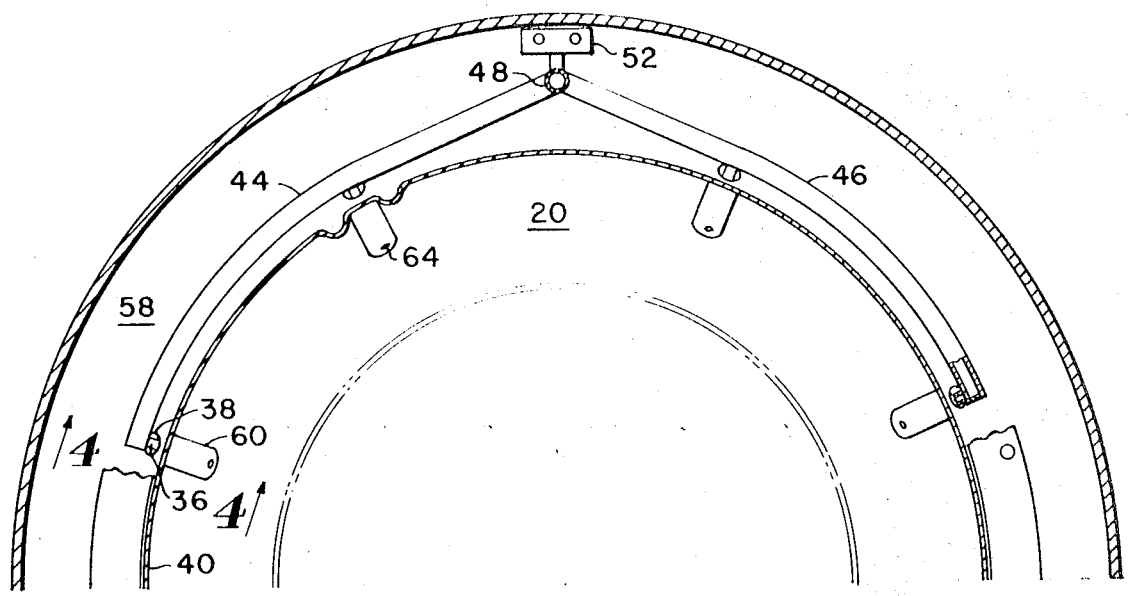
FIG. 2 is a view taken on lines 2—2 of FIG. 1.

As seen in FIGS. 1 and 2, a fluidic temperature sensor assembly used with the engine comprises a series of radially extending tubes 36 which extend through openings 38 in an annular flow path defining duct 40 and into the hot gas or motive fluid stream adjacent the turbine inlet nozzle assembly 22. Tubes 36 each have a plurality of flared inlet ports 42 which are radially spaced from one another to obtain gas flow from radially spaced positions in the motive fluid stream, as seen in FIG. 4. One end of the tubes 36 extends to circumferentially extending conduits 44 and 46 which extend to a discharge conduit 48.

The discharge conduit 48 extends to a discharge point which is at a pressure lower than that at the turbine inlet nozzle assembly 22. In some cases this may be the turbine discharge and in other cases it may be the ambient atmosphere. The pressure differential across the tubes and conduits and the flow path area therethrough are selected so that a relatively high velocity flow path is established from the turbine inlet to the low pressure discharge point.

Figure 3:
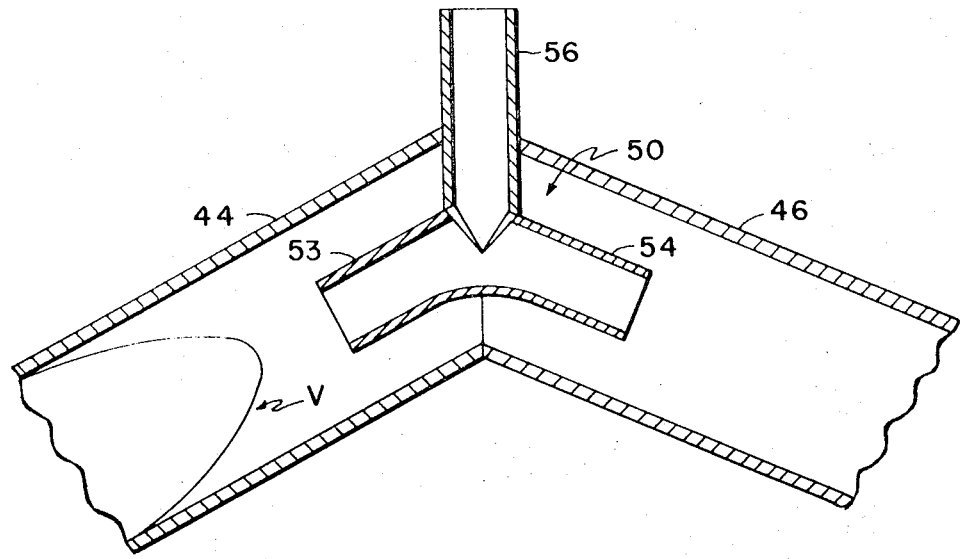
FIG. 3 is a greatly enlarged fragmentary view taken on lines 3—3 of FIG. 1.

At the junction between the circumferential branch conduits 44, 46 and the discharge conduit 48, there is positioned a Y-shaped tubular element 50, as seen in FIG. 3. The Y-shaped tubular element has inlets 53 and 54 which extend respectively into and coaxial with branch circumferential conduits 44 and 46, respectively. An outlet 56 extends from the inlets 53, 54 exterior of the circumferential conduits 44, 46 to a fluidic oscillator 52.

The fluidic oscillator 52 may be one of a number of fluidic oscillator types adapted to receive a flow of hot gases and establish pressure oscillations in a resonant chamber that are directly proportional to the temperature of the gas fed to the oscillator. The oscillator 52 may be error compensated in the fashion described in copending application Ser. No. 888,220, filed Dec. 29, 1969, entitled "Error Compensated Fluidic Temperature Sensor," of common inventorship and assignment with the present invention.

In order to maintain the fluidic oscillator and conduits at temperature levels which permit prolonged operation, it is necessary to immerse them in a source of cooling fluid. This is done by surrounding the oscillator and conduits with the annular duct assembly 40 which forms a wall of the annular flow path leading to the turbine inlet. The duct assembly 40 ends at the radially outward portion of the turbine nozzle vane assembly 22 so that it forms a chamber 58 for cooling air which has been discharged from openings 35 in the radially outward portion of the vanes 24. In addition, the radial tubular elements 36 are surrounded by tubular shells 60 which extend from openings 38 in duct 40. The flared inlets 42 project through openings 62 in the upstream side of tubular shells 60. A discharge outlet 64 is formed in the downstream side of the tubular shells 60 so that the cooling air passes from chamber 58 through the tubular shell 60, around tubular elements 36 and out discharge port 64 to maintain them in a source of cooling fluid.

In operation, hot gases passing through annular passageway 20 enter inlets 42 and pass from there to branch conduits 44, 46 toward discharge conduit 48 at a relatively high velocity. This velocity establishes a parabolic velocity distribution, shown as curve V in FIG. 3, with the maximum velocity of the stream near the axis of the conduit. The temperature gradient of the fluid stream follows a similar distribution wherein the maximum temperature of the fluid stream is at the center of the conduit. Since the Y-shaped tubular element 50 has openings 53 and 54 positioned on the axis of circumferential conduits 44 and 46, the gases passing into them and to the fluidic oscillator 52 have the greatest velocity in the stream and have the highest temperature. This enables the high velocity of the stream flowing through the system to cause the fluidic oscillator to react quickly to changes in temperature, even though it is positioned at a position remote from the stream itself. Because the Y-shaped inlet element 50 receives only a small portion of the total gas flow, the oscillation 52 may be of a relatively small size to minimize the overall space requirements of the system.

The gas flowing to the oscillator 52 comes from a plurality of circumferentially spaced locations so that the resultant temperature represents an average turbine inlet temperature. The streams from the various locations give and receive heat energy when they mix to produce a resultant temperature that is an average of the individual temperature. In addition, the radially spaced inlet ports 42 provide a further averaging of the temperature because they receive fluid from radially spaced points in the motive fluid flow path. It should be noted that the fluidic temperature sensing assembly extends for 180 degrees of the annular flow path at the turbine inlet. An additional assembly or assemblies may be used to cover the full 360 degrees of the flow path. In this case the output from the fluidic oscillators would be averaged.

The above fluidic oscillator assembly has been shown in connection with the measurement of turbine inlet temperatures in a gas turbine engine. However, it should be apparent to those skilled in the art that it may be employed to measure motive fluid temperatures at any station in a gas turbine engine with equal advantage.

What has been shown as novel and desired to be secured by Letters Patent is:

1. A fluidic temperature sensing assembly for sensing the temperature at a station in the annular motive fluid flow path of a gas turbine engine, said assembly comprising:

means for providing a high velocity flow path for fluid from a plurality of locations circumferentially spaced from one another around at least a portion of said annular motive fluid flow path at said station to a lower pressure discharge point;

means for providing an inlet immersed in said high velocity flow path for receiving the portion of the fluid stream having the highest velocity and highest temperature and positioned to receive the motive fluid from said plurality of locations; and a fluidic oscillator connected to said inlet means so that the oscillator produces pressure oscillations in direct proportion to the temperature of the gas turbine motive fluid stream at said station.

2. Apparatus as in claim 1 wherein said flow path means has a plurality of inlets at each circumferentially spaced location, said inlets each being spaced from one another radially with respect to said annular flow path for receiving motive fluid from a plurality of radially spaced locations at each circumferentially spaced location of said station.

3. Apparatus as in claim 2 wherein said high velocity passageway means comprises:

a circumferentially extending conduit positioned outside of said annular flow path at said station;

a plurality of tubes extending radially into said motive fluid stream from said circumferentially extending conduit, each tube having said plurality of spaced inlets;

a discharge conduit extending from said circumferentially extending conduit to a low pressure discharge.

4. Apparatus as in claim 3 wherein said inlet means is positioned at the junction between said circumferentially extending conduit and said discharge conduit.

5. Apparatus as in claim 4 wherein said discharge conduit is connected to said circumferentially extending conduit so that a pair of circumferential branches are formed which extend to said discharge conduit and wherein said inlet means comprises a Y-shaped tubular element having openings extending into said circumferential branches and having an outlet extending exterior of said circumferentially extending conduit to said fluidic oscillator.

6. Apparatus as in claim 5 wherein said Y-shaped tubular element is positioned so that its inlets are substantially coaxial with said circumferential branches thereby receiving hot gases with a maximum velocity.

7. Apparatus as in claim 6 for sensing the temperature of the motive fluid stream at the turbine inlet of a gas turbine engine that incorporates an air-cooled turbine inlet nozzle, and wherein said apparatus further comprises:

an annular chamber surrounding said circumferential and discharge conduit, said annular chamber being supplied with a source of cooling air; and a plurality of tubular elements surrounding and conforming to the size of said radially extending tubular elements, said tubular elements being connected to said chamber and having an outlet so that a flow of cooling air passes over said radially extending tubes into the motive fluid stream.

8. Apparatus as in claim 7 wherein said annular chamber is formed in part by a wall of the annular motive fluid flow path extending to the turbine nozzle assembly.

References Cited

UNITED STATES PATENTS

| | | | |
|---|---|---|---|
| 2,582,232 | 1/1952 | Cesaro | 73—339 |
| 3,491,797 | 1/1970 | Taplin | 73—349 X |

FOREIGN PATENTS

| | | | |
|---|---|---|---|
| 734,702 | 8/1955 | Great Britain | 73—349 |

LOUIS R. PRINCE, Primary Examiner

D. E. CORR, Assistant Examiner

U.S. Cl. X.R.

73—339 A, 349